US012779977B2

(12) United States Patent
Shinozaki et al.

(10) Patent No.: US 12,779,977 B2
(45) Date of Patent: Nov. 3, 2026

(54) CRAWLER DRIVE UNIT AND CONSTRUCTION MACHINE

(71) Applicant: Nabtesco Corporation, Tokyo (JP)

(72) Inventors: Takuya Shinozaki, Tokyo (JP); Etsuro Komori, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 905 days.

(21) Appl. No.: 17/670,934

(22) Filed: Feb. 14, 2022

(65) Prior Publication Data

US 2022/0314782 A1 Oct. 6, 2022

(30) Foreign Application Priority Data

Mar. 31, 2021 (JP) ................................ 2021-059731
Jun. 8, 2021 (JP) ................................ 2021-095955

(51) Int. Cl.
*B60K 7/00* (2006.01)
*B60K 17/04* (2006.01)
(Continued)

(52) U.S. Cl.
CPC .......... *B60K 7/0007* (2013.01); *B60K 17/046* (2013.01); *B62D 55/065* (2013.01);
(Continued)

(58) Field of Classification Search
CPC .. B62D 55/065; B62D 55/125; B60K 17/046; B60K 7/0007; B60K 2007/003; B60K 2007/0092; B60Y 2200/25; B60Y 2200/41
See application file for complete search history.

(56) References Cited

U.S. PATENT DOCUMENTS 3,872,939 A * 3/1975 Eckert .................... B62D 55/13
180/9.62
4,392,396 A * 7/1983 Sato ...................... F16H 37/041
74/411
(Continued)

FOREIGN PATENT DOCUMENTS

JP 04-208638 A 7/1992
JP 2002-321665 A 11/2002
(Continued)

OTHER PUBLICATIONS

Extended European Search Report dated Aug. 22, 2022, issued in corresponding European Patent Application No. 22157795.0 (12 pgs.).

(Continued)

*Primary Examiner* — Christopher B Wehrly
(74) *Attorney, Agent, or Firm* — Pillsbury Winthrop Shaw Pittman, LLP

(57) ABSTRACT

A crawler drive unit relating to one aspect of the present disclosure includes a speed reduction mechanism provided in a running unit for causing a vehicle body to run, where the speed reduction mechanism is configured to transmit a driving force to a crawler provided on the running unit, a transmission mechanism for transmitting the driving force to the speed reduction mechanism, and an electric motor for applying a rotational force to the transmission mechanism. A motor shaft of the electric motor is positioned higher than a rotational axis of an input shaft of the speed reduction mechanism.

8 Claims, 8 Drawing Sheets

(51) Int. Cl.
*B62D 55/065* (2006.01)
*B62D 55/125* (2006.01)

(52) U.S. Cl.
CPC ...... *B62D 55/125* (2013.01); *B60K 2007/003* (2013.01); *B60K 2007/0092* (2013.01); *B60Y 2200/25* (2013.01); *B60Y 2200/41* (2013.01)

(56) References Cited

U.S. PATENT DOCUMENTS

| | | | | |
|---|---|---|---|---|
| 4,739,852 | A * | 4/1988 | Stevens | B62D 55/125 180/9.62 |
| 9,618,084 | B2 * | 4/2017 | Wagh | B62D 55/12 |
| 10,293,883 | B1 * | 5/2019 | Bedard | B62M 27/02 |
| 11,364,959 | B1 * | 6/2022 | Boe | B62D 55/084 |
| 2009/0078528 | A1 * | 3/2009 | Uzawa | E02F 9/02 192/12 D |
| 2011/0259657 | A1 | 10/2011 | Fuechtner | |
| 2018/0344118 | A1 * | 12/2018 | Kim | B62D 55/24 |
| 2019/0023072 | A1 * | 1/2019 | Lubben | F16H 48/08 |
| 2019/0141955 | A1 * | 5/2019 | Dharmesh | G05D 1/0278 119/703 |
| 2020/0406996 | A1 * | 12/2020 | Kohigashi | B60L 50/60 |
| 2021/0009215 | A1 * | 1/2021 | Jagtap | B62D 55/116 |
| 2021/0219481 | A1 * | 7/2021 | Haynes | A01B 75/00 |
| 2021/0291916 | A1 * | 9/2021 | Kautsch | B62D 55/0655 |
| 2021/0403106 | A1 * | 12/2021 | Sterling | B62D 55/125 |
| 2022/0185092 | A1 * | 6/2022 | Payne | B60K 6/40 |
| 2023/0014070 | A1 * | 1/2023 | Gomiero | B62D 55/14 |
| 2023/0286601 | A1 * | 9/2023 | Bona | B62D 55/116 |
| 2024/0166277 | A1 * | 5/2024 | Thorén | B60K 7/0007 |

FOREIGN PATENT DOCUMENTS

| | | | |
|---|---|---|---|
| JP | 2008-240342 | A | 10/2008 |
| WO | 03/104067 | A1 | 12/2003 |
| WO | 2007/022865 | A1 | 3/2007 |
| WO | 2014/125856 | A1 | 8/2014 |

OTHER PUBLICATIONS

Office Action dated Feb. 12, 2025, issued in corresponding Japanese Patent Application No. 2021-095955 with English translation (8 pgs.).

* cited by examiner

CRAWLER DRIVE UNIT AND CONSTRUCTION MACHINE

CROSS-REFERENCE TO RELATED APPLICATIONS

This application is based on and claims the benefit of priority from Japanese Patent Application Serial Nos. 2021-059731 (filed on Mar. 31, 2021) and 2021-095955 (filed on Jun. 8, 2021), the contents of which are incorporated herein.

TECHNICAL FIELD

The present disclosure relates to a crawler drive unit and a construction machine.

BACKGROUND

Construction machines include running units for allowing their vehicle bodies to run even on rough roads, and the running units can be crawlers, instead of wheels used in passenger cars. A crawler is engaged with a drive wheel (sprocket) rotatable around an axis. The drive wheel can be driven and rotated by a drive unit, which is often a hydraulic drive unit using a hydraulic motor as such a motor can easily produce a large rotational torque. The hydraulic drive unit includes, in addition to the hydraulic motor, a hydraulic pump configured to feed hydraulic oil to the hydraulic motor and an engine configured to drive the hydraulic pump. The hydraulic oil discharged from the hydraulic pump is fed to the hydraulic motor through piping routed within the construction machine (see, for example, Japanese Patent Application Publication No. 2008-240342).

Recent years has seen a growing demand for the use of electric drive units in place of hydraulic drive units for the purposes of simplifying construction machines. An electric drive unit includes a battery in place of an engine, and an electric motor to be driven by power provided by the battery. The electric drive unit no longer needs a hydraulic pump as well as piping routed within a construction machine.

Given that electric and hydraulic motors have the same size, the rotational torque of the electric motor tends to be less than that of the hydraulic motor. Accordingly, if an electric drive unit is used, an electric motor of a larger size is used and combined with a speed reduction mechanism, which slows down the rotation of the electric motor and outputs the resulting rotation.

The speed reduction mechanism has a plurality of gears provided in a housing in a rotatable manner. When provided in a running unit, the speed reduction mechanism may use the housing as the output part. Considering the above, the electric drive unit is desirably contained within the running unit as entirely as possible so that the electric drive unit does not stick out of the running unit, because the drive unit can avoid getting damaged by soil, sand, rocks and the like while the construction machine is in motion. For this reason, the speed reduction mechanism may be housed within the drive wheel such that they are aligned with each other. The drive wheel can rotate integrally with the housing (the output part).

If an attempt is made to simply replace a hydraulic drive unit with an electric drive unit, an electric motor and a speed reduction mechanism need to be fitted into the space that is originally occupied by n hydraulic motor. The speed reduction mechanism can be contained within the running unit in the width direction or within its width (within the width of the sprocket), but the electric motor cannot avoid protruding out of the running unit in the width direction. This may result in the electric motor coming into contact with soil, sand, rocks and the like while the construction machine is in motion, which could damage the electric motor. In particular, if the speed reduction mechanism and the electric motor are placed at a similar height, this means that the electric motor is positioned close to the road surface. As a result, the electric motor may have a higher chance of getting damaged.

SUMMARY

The present disclosure is designed to provide a crawler drive unit and a construction machine that can lower the chance of an electric motor coming into contact with soil, sand, rocks and the like.

One aspect of the present disclosure provides a crawler drive unit including a speed reduction mechanism provided in a running unit for causing a vehicle body to run, where the speed reduction mechanism is configured to transmit a driving force to a crawler provided on the running unit, a transmission mechanism for transmitting the driving force to the speed reduction mechanism, and an electric motor for applying a rotational force to the transmission mechanism. The speed reduction mechanism includes an input part for receiving the driving force input thereto from the transmission mechanism. A motor shaft of the electric motor is positioned higher than a rotational axis of the input part.

With such arrangement, the electric motor can be positioned higher than the speed reduction mechanism. In this way, the electric motor can be spaced away as much as possible from the road surface even if the electric motor and the speed reduction mechanism constitutes the crawler drive unit, which is provided in the crawler, and the electric motor protrudes out of the roller in the width direction. This can lower the chance of the electric motor coming into contact with soil, sand, rocks and the like.

In the above crawler drive unit, a rotational axis of the motor shaft may be parallel to the rotational axis of the input part.

In the above crawler drive unit, the electric motor may protrude out of the speed reduction mechanism in a width direction of the vehicle body.

In the above crawler drive unit, the transmission mechanism may include a plurality of gears meshing with each other.

In the above crawler drive unit, the transmission mechanism may reduce rotation of the motor shaft and transmit the reduced rotation to the input part.

In the above crawler drive unit, the electric motor may be entirely positioned higher than the rotational axis of the input part.

In the above crawler drive unit, a bottom edge of the electric motor may be aligned with a bottom surface of the vehicle body, or the electric motor may be entirely positioned higher than the bottom surface of the vehicle body.

In the above crawler drive unit, the speed reduction mechanism may be housed such that at least part thereof is contained within the crawler in a width direction of the vehicle body.

Another aspect of the present disclosure provides a crawler drive unit including a speed reduction mechanism provided in a running unit for causing a vehicle body to run, where the speed reduction mechanism is configured to transmit a driving force to a crawler provided on the running unit, a transmission mechanism for transmitting the driving force to the speed reduction mechanism, and an electric motor protruding out of the speed reduction mechanism in a width direction of the vehicle body, the electric motor being configured to apply a rotational force to the speed reduction mechanism. The transmission mechanism reduces rotation of a motor shaft of the electric motor and transmits the reduced rotation to the speed reduction mechanism, and a bottom edge of the electric motor is aligned with a bottom surface of the vehicle body, or the electric motor is entirely positioned higher than the bottom surface of the vehicle body.

With such arrangement, the electric motor can be positioned higher than the speed reduction mechanism. In this way, the electric motor can be spaced away as much as possible from the road surface even if the electric motor and the speed reduction mechanism constitutes the crawler drive unit, which is provided in the crawler, and the electric motor protrudes out of the roller in the width direction. This can lower the chance of the electric motor coming into contact with soil, sand, rocks and the like. In addition to the speed reduction mechanism, the transmission mechanism can also contribute to reduce the rotation of the motor shaft. As a result, while the crawler drive unit achieves a reduced size, it can also accomplish a high reduction ratio. The crawler drive unit relating to the present aspect can achieve a high output.

Another aspect of the present disclosure provides a crawler drive unit including two speed reduction mechanisms respectively provided in left and right running units for causing a vehicle body to run, where the speed reduction mechanisms are configured to transmit a driving force to crawlers respectively provided on the running units, a transmission mechanism for transmitting the driving force to the speed reduction mechanisms, and two electric motors respectively protruding out of the speed reduction mechanisms inwardly in a width direction of the vehicle body, the electric motors being configured to apply a rotational force to the speed reduction mechanisms. The two electric motors are arranged next to each other in a front-rear direction of the vehicle body.

With such arrangement, even when the left and right crawlers are arranged with a short distance being provided therebetween, the respective crawler drive units on the crawlers can be prevented from interfering with each other. This eliminates the need of providing crawler drive units for different spacings between the left and right crawlers, which can increase the versatility of the crawler drive units.

In the above crawler drive unit, the two speed reduction mechanisms may each include an input part for receiving the driving force input thereto from the transmission mechanism. Motor shafts of the electric motors may be positioned higher than a rotational axis of the input parts.

Another aspect of the present disclosure provides a construction machine including a vehicle body, a running unit for causing the vehicle body to run, a speed reduction mechanism provided in the running unit, where the speed reduction mechanism is configured to transmit a driving force to a crawler provided on the running unit, a transmission mechanism for transmitting the driving force to the speed reduction mechanism, and an electric motor protruding out of the speed reduction mechanism in a width direction of the vehicle body, where the electric motor is configured to apply a rotational force to the speed reduction mechanism. The transmission mechanism reduces rotation of a motor shaft of the electric motor and transmits the reduced rotation to the speed reduction mechanism, and a bottom edge of the electric motor is aligned with a bottom surface of the vehicle body, or the electric motor is entirely positioned higher than the bottom surface of the vehicle body.

With such arrangement, the electric motor can be positioned higher than the speed reduction mechanism. In this way, the electric motor can be spaced away as much as possible from the road surface even if the electric motor and the speed reduction mechanism constitutes the crawler drive unit, which is provided in the crawler, and the electric motor protrudes out of the roller in the width direction. This can lower the chance of the electric motor coming into contact with soil, sand, rocks and the like. The construction machine relating to this aspect can run well.

The crawler drive unit and construction machine described above can lower the chance of the electric motor coming into contact with soil, sand, rocks and the like.

DESCRIPTION OF THE PREFERRED EMBODIMENTS

The following describes embodiments of the present disclosure with reference to the drawings.

First Embodiment

<Construction Machine>

Figure 1:
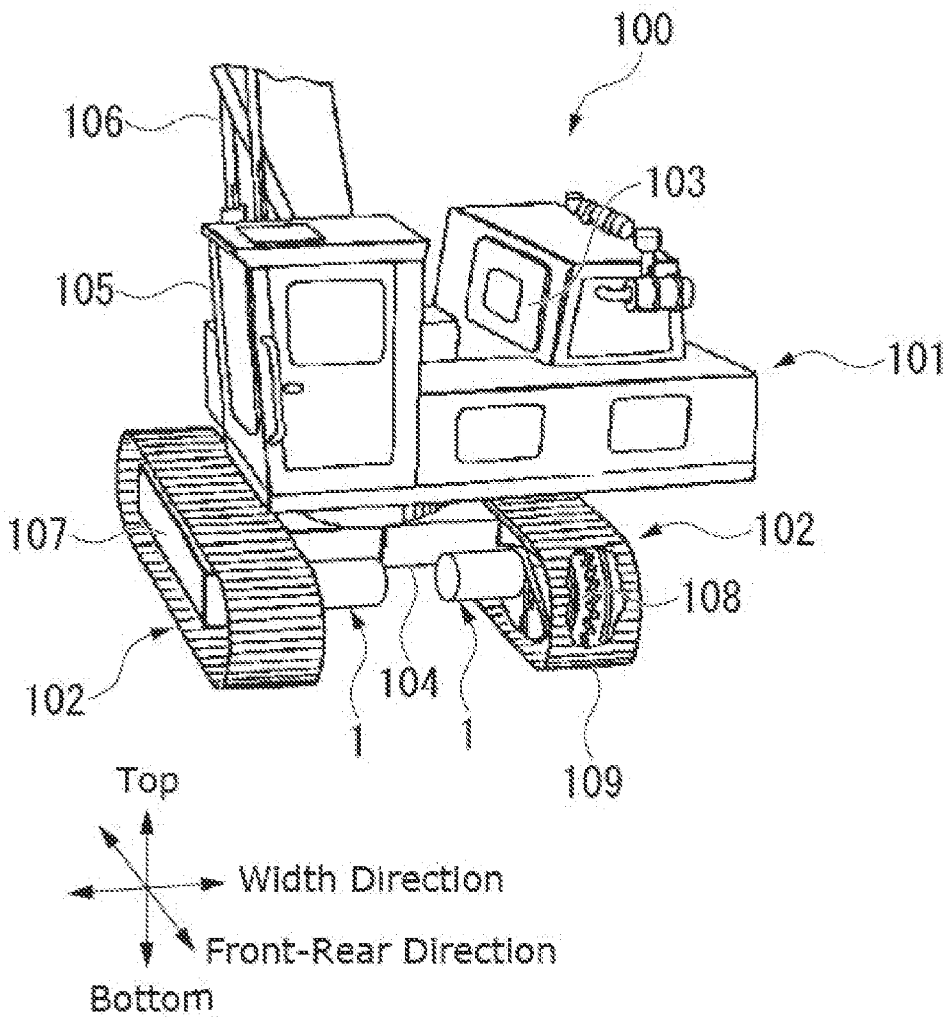
FIG. 1 is a perspective view showing a construction machine according to a first embodiment of the disclosure.

FIG. 1 is a perspective view of a construction machine 100. As shown in FIG. 1, the construction machine 100 is designed to, for example, excavate soil and sand. The construction machine 100 performs various construction works, for example, transports excavated soil and sand to another vehicle. The construction machine 100 includes a vehicle body 101, running units 102 for causing the vehicle body 101 to run, and crawler drive units 1 provided on the running units 102 and configured to drive the running units 102. In the following description, the term "front-rear direction" refers to the direction in which the construction machine 100 runs forward and backward. The simple term "width direction" refers to the direction in which the width of the construction machine 100 is defined, which extends horizontally and is orthogonal to the front-rear direction.

The vehicle body 101 includes a swivel body 103 and a lower frame 104 provided below the swivel body 103 and pivotably supporting the swivel body 103. The swivel body 103 has a cab 105 on which an operator can board, and a boom 106 that is swingably connected at one end thereof to the swivel body 103. Although not shown in FIG. 1, an arm is swingably provided at the other end of the boom 106. A bucket or the like is attached to the end of the arm that is opposite to the end having the boom 106. The running units 102 are provided on the respective sides of the lower frame 104 in the width direction.

The running units 102 each include a track frame 107 connected to the lower frame 104 and long in the front-rear direction, an idler rotatably provided in the front portion of the track frame 107 although not shown, a drive wheel (sprocket) 108 rotatably provided in the rear portion of the track frame 107, a plurality of rolling wheels rotatably provided in the lower portion of the track frame 107 although not shown, and a crawler 109 wound over the idler, drive wheel 108 and rolling wheels. The crawler 109 is made of hard rubber, or metals such as iron. The crawler drive unit 1 is provided to rotate and drive the drive wheel 108.

<Crawler Drive Unit>

Figure 2:
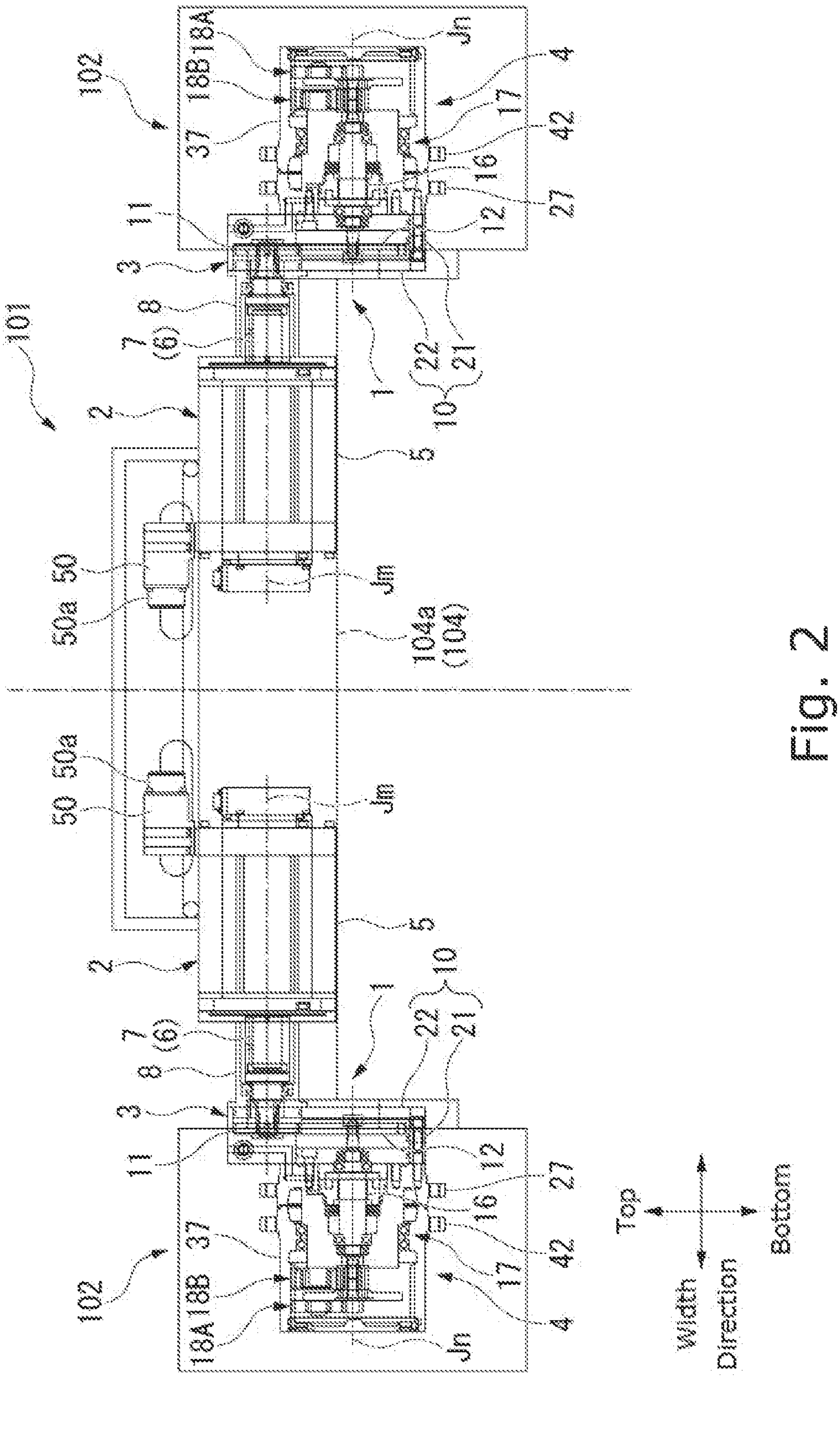
FIG. 2 is a plan view of crawlers, a lower frame and crawler drive units relating to the first embodiment of the present disclosure, viewed in a front-rear direction.
Figure 3:
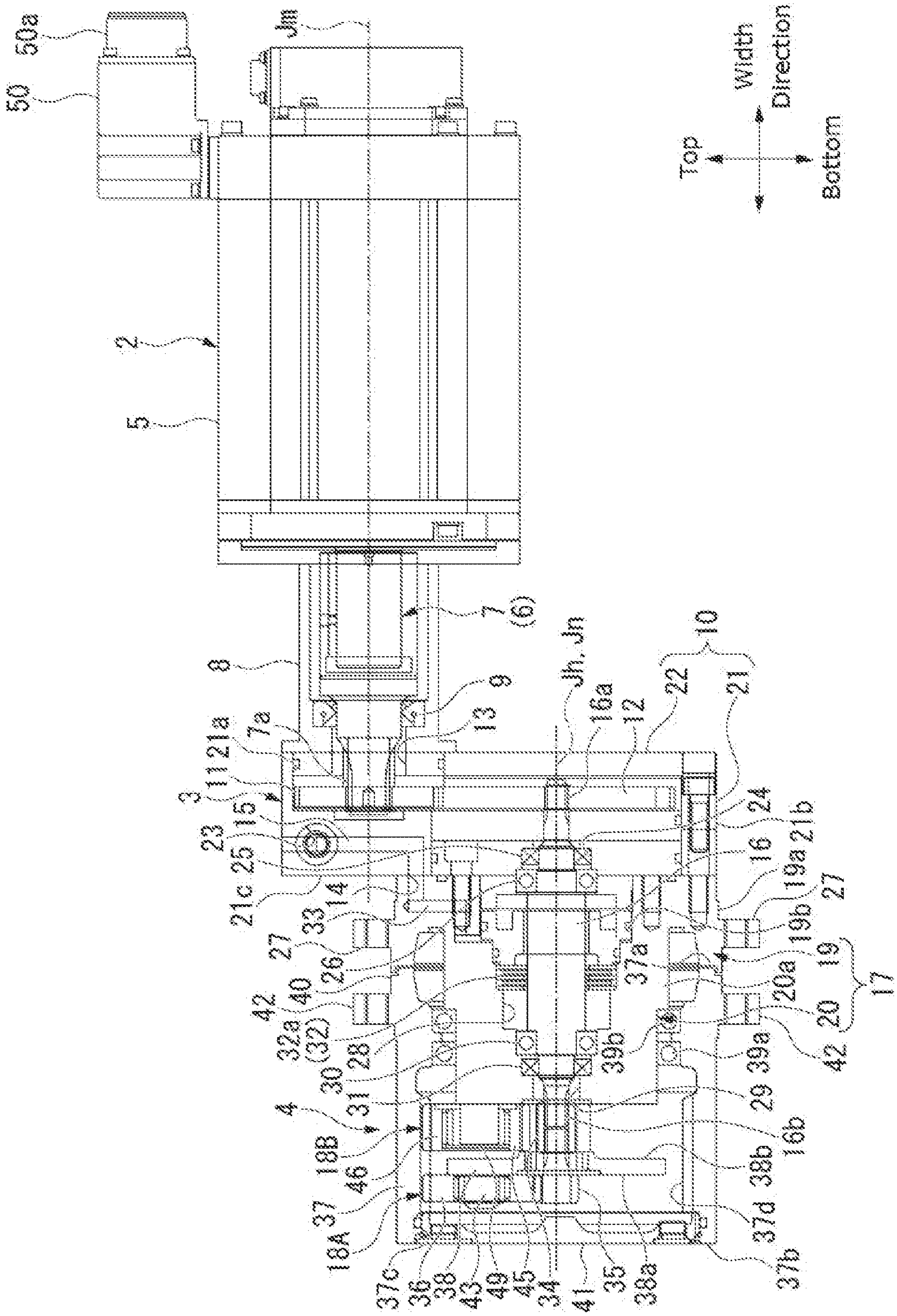
FIG. 3 is a sectional view showing the crawler drive unit according to the first embodiment of the present disclosure.

FIG. 2 is a plan view of the running units 102, lower frame 104 and crawler drive units 1, viewed in the front-rear direction. FIG. 3 is a sectional view showing the crawler drive unit 1. As shown in FIGS. 2 and 3, the crawler drive unit 1 has an electric motor 2, a transmission mechanism 3 connected to the electric motor 2, and a speed reduction mechanism 4 connected to the transmission mechanism 3.

<Electric Motor>

The electric motor 2 includes a stator fixedly attached within a motor case 5, although not shown, and a rotor 6 rotatable relative to the stator. The electric motor 2 is driven by the power fed thereto from an external power supply (battery) provided in the vehicle body 101. The electric motor 2 can be any one of a variety of motors as long as they are driven by power fed thereto, such as so-called brush motors and brushless motors.

The motor case 5 has a connector 50 on the outer peripheral surface thereof, which is designed to feed power to the not-shown stator. To the connector 50, an external connector extending from the not-shown external power supply is connected. The connector 50 has a receiving port 50*a* to which the not-shown external connector is connected.

The motor case 5 rotatably supports a motor shaft 7 of the rotor 6. A part of the motor shaft 7 protrudes out of the motor case 5 in the direction along the rotational axis Jm of the motor shaft 7. A tip end 7*a* of the protruding portion of the motor shaft 7 has splines on the outer peripheral surface thereof. To the tip end 7*a*, the transmission mechanism 3 is connected. The receiving port 50*a* of the connector 50 on the motor case 5 is oriented away from the tip end 7*a* of the motor shaft 7.

The portion of the motor shaft 7 that protrudes out of the motor case 5 is surrounded by a cylindrical support case 8. The support case 8 protrudes out of the motor case 5 in the direction along the rotational axis Jm and terminates before the tip end 7*a* of the motor shaft 7. The support case 8 has, on the inner peripheral surface thereof, a seal member 9 on the side opposite to the motor case 5. The seal member 9 ensures the seal between the support case 8 and the motor shaft 7. The end of the support case 8 opposite to the motor case 5 is also connected to the transmission mechanism 3.

<Transmission Mechanism>

The transmission mechanism 3 includes a transmission-side housing 10 and two spur gears 11 and 12 (a first spur gear 11, a second spur gear 12) rotatably housed in the transmission-side housing 10. The transmission-side housing 10 has a housing body 21 shaped like a box open toward the electric motor 2, and a closing plate 22 closing an opening 21*a* of the housing body 21. The support case 8 is fixedly attached to the closing plate 22. The closing plate 22 has a shaft insertion hole 13 formed therein into which the motor shaft 7 is inserted. The tip end 7*a* of the motor shaft 7 is inserted into the housing body 21 through the shaft insertion hole 13.

An outer peripheral wall 21*b* of the housing body 21 has a working oil inlet 23 formed therein. A bottom wall 21*c* of the housing body 21 has a connection port 14 formed therein. The housing body 21 has a transmission-side oil channel 15 formed therein, which establishes communication between the connection port 14 and the working oil inlet 23 and extends from the outer peripheral wall 21*b* to the bottom wall 21*c*. The working oil inlet 23, the connection port 14, and the transmission-side oil channel 15 are used to inject a lubricant oil into the speed reduction mechanism 4.

In the housing body 21, the two spur gears 11 and 12 are stored while meshing with each other. Of the two spur gears 11 and 12, the first spur gear 11 is fixedly fitted onto the tip end 7*a* of the motor shaft 7. The splines on the tip end 7*a* allows the motor shaft 7 and the first spur gear 11 to rotate integrally with each other.

Of the two spur gears 11 and 12, the second spur gear 12 is rotatable on the axis Jh, which is parallel to and offset from the rotational axis Jm of the motor shaft 7 in the radial direction with respect to the motor shaft 7 (the second spur gear 12). The second spur gear 12 has a larger number of teeth than the first spur gear 11. Accordingly, the rotation of the second spur gear 12 is slower than the rotation of the first spur gear 11.

Into the second spur gear 12, an end 16*a* of an input shaft (an example of an input part recited in the claims) 16 of the speed reduction mechanism 4 is fixedly fitted. The end 16*a* has splines, so that the second spur gear 12 and the input shaft 16 are rotatable integrally with each other. The rotational axis Jn of the input shaft 16 is aligned with the rotational axis Jh of the second spur gear 12. Since the rotational axis Jh of the second spur gear 12 is parallel to the rotational axis Jm of the motor shaft 7, the rotational axis Jn of the input shaft 16 is also parallel to the rotational axis Jm of the motor shaft 7.

The input shaft 16 is solid. The input shaft 16 is inserted into the housing body 21 from the speed reduction mechanism 4 side through a shaft insertion hole 24 formed in the bottom wall 21*c* of the housing body 21. In the shaft insertion hole 24, a seal member 25, and a bearing 26 are provided. The seal member 25 seals between the bottom wall 21*c* of the housing body 21 and the input shaft 16. The bearing 26 rotatably supports the input shaft 16 on the transmission mechanism 3 side thereof.

<Speed Reducing Mechanism>

The speed reduction mechanism 4 includes, in addition to the input shaft 16, a reduction-side housing 17 that rotatably supports the input shaft 16, and a plurality of stages (two stages in the present embodiment) formed by gear mechanism 18A and 18B (the first and second stages are respectively formed by the gear mechanisms 18A and 18B) connected to the reduction-side housing 17. In the following description of the speed reduction mechanism 4, the simple term “radial direction” refers to the radial direction of the input shaft 16.

The reduction-side housing 17 is fixedly attached to the bottom wall 21*c* of the housing body 21 constituting the transmission-side housing 10. The reduction-side housing 17 has a base part 19 and a bearing housing 20 that form a single piece. The base part 19 is stacked on the bottom wall 21*c* of the housing body 21, and the bearing housing 20 protrudes from the base part 19 away from the electric motor 2. A plurality of first fastener seats 27 are integrally formed on an outer peripheral surface 19*a* of the base part 19 such that the first fastener seats 27 protrude outwardly in the radial direction. The first fastener seats 27 are used to secure the crawler drive unit 1 to the running unit 102. The base part 19 has a through hole 19*b* formed therein through which the input shaft 16 runs.

The bearing housing 20 has a depression 28, which is continuous from the through hole 19*b* formed in the base part 19. At the bottom of the depression 28 (on the side opposite to the transmission mechanism 3), a shaft insertion hole 29 is formed through the bearing housing 20 in the direction extending along the rotational axis Jn. Through the shaft insertion hole 29, another end 16*b* of the input shaft 16 projects away from the transmission mechanism 3. In the shaft insertion hole 29, a bearing 30 and a seal member 31 are provided. The bearing 30 rotatably supports the input shaft 16, and the seal member 31 seals between the bearing housing 20 and the input shaft 16.

A parking brake 32 is provided in the depression 28 in the bearing housing 20. The parking brake 32 is configured to restrict or allow the rotation of the input shaft 16. The parking brake 32 includes a plate 32*a*, which is constantly pressed by a not-shown spring. This restricts the rotation of the input shaft 16. To release the parking brake 32, a working oil is supplied to the parking brake 32. This allows the working oil to produce pressure to compress and deform the not-shown spring. This resultantly releases the plate 32*a* from being pressed by the spring, thereby releasing the input shaft 16.

On an outer peripheral wall 20*a* of the bearing housing 20, a reduction-side oil channel 33 is formed to establish connection between the depression 28 and the connection port 14 of the transmission-side housing 10. Through the reduction-side oil channel 33, the connection port 14 of the transmission-side housing 10, the transmission-side oil channel 15 and the working oil inlet 23, the working oil is fed from outside into the depression 28. This activates the parking brake 32. A plurality of second pillars 49, which are integrally formed on the bearing housing 20, project from the side away from the transmission mechanism 3. The second pillars 49 constitute part of the gear mechanisms 18A and 18B.

The gear mechanisms 18A and 18B are located on the opposite side to the transmission mechanism 3 with the bearing housing 20 being provided therebetween, and aligned with the rotational axis Jn. The gear mechanisms 18A and 18B are arranged next to each other in the order of the gear mechanism 18A of the first stage and the gear mechanism 18B of the second stage, such that the gear mechanism 18B is closer to the bearing housing 20 than is the gear mechanism 18A.

The gear mechanism 18A of the first stage is a so-called planetary gear mechanism. The gear mechanism 18A of the first stage includes a first sun gear 35, a first planetary gear 36, an internal gear 37, and a first planetary gear 38. The first sun gear 35 is coupled to the other end 16*b* of the input shaft 16 via a coupling 34, the first planetary gear 36 meshes with the first sun gear 35, the internal gear 37 meshes with the first planetary gear 36, and the first planetary carrier 38 supports the first planetary gear 36. The first sun gear 35 is rotatable integrally with the input shaft 16. A plurality of (for example, three) first planetary gears 36 are provided. The first planetary gears 36 are arranged at equal intervals around the first sun gear 35.

The internal gear 37 is cylindrically shaped to surround the gear mechanisms 18A and 18B and the bearing housing 20. An end 37*a* of the internal gear 37 facing the transmission mechanism 3 is close to the base part 19 of the reduction-side housing 17. Between the base part 19 and the end 37*a* of the internal gear 37, a mechanical seal (floating seal) 40 is provided. The mechanical seal 40 can prevent grease (lubricating oil) stored in the internal gear 37 from leaking out through between the end 37*a* of the internal gear 37 and the base part 19.

At another end 37*b* of the internal gear 37 facing away from the transmission mechanism 3, an end plate 41 is provided to close an opening 37*c* of the internal gear 37. A plurality of second fastener seats 42 are integrally formed on the outer peripheral surface of the internal gear 37, positioned near the transmission-side housing 10, and protrude outwardly in the radial direction. The second fastener seats 42 are configured to transmit the driving force produced by the crawler drive unit 1 to the running unit 102 (see the below for more details).

The internal gear 37 is rotatably supported on the bearing housing 20 via two bearings 39*a* and 39*b*. The internal gear 37 has internal teeth 37*d* positioned correspondingly to the gear mechanisms 18A and 18B. The internal teeth 37*d* mesh with the first planetary gears 36.

The first planetary carrier 38, which supports the first planetary gears 36, is located on the side facing the bearing housing 20. The first planetary carrier 38 has, on a surface 38*a* thereof facing the first planetary gears 36, first pillars 43 protruding and rotatably supporting the first planetary gears 36. The first planetary carrier 38, on another surface 38*b* thereof facing the bearing housing 20, a second sun gear 45 integrated therewith. The second sun gear 45 constitutes the second-stage gear mechanism 18B.

The gear mechanism 18B of the second stage includes, in addition to the second sun gear 45, a carrier gear 46, and the internal gear 37. The carrier gear 46 meshes with the second sun gear 45, and the internal gear 37 meshes with the carrier gear 46. The internal gear 37 is shared between the gear mechanism 18B of the second stage and the gear mechanism 18A of the first stage. The second sun gear 45 is shaped like a cylinder. The coupling 34 is inserted into the second sun gear 45 such that the coupling 34 is rotatable relative to the second sun gear 45. A plurality of (for example, three) carrier gears 46 are provided. The carrier gears 46 are arranged at equal intervals around the second sun gear 45. The carrier gears 46 are rotatably supported by the second pillars 49 integrated with the bearing housing 20.

With the above arrangement, the crawler drive unit 1 is arranged such that the internal gear 37 of the speed reduction mechanism 4 is contained within the drive wheel 108 in the radial direction. The electric motor 2 is positioned inside the speed reduction mechanism 4 in the width direction. The second fastener seats 42 of the internal gear 37 are fixedly attached to the drive wheel 108. The internal gear 37 is rotatable integrally with the drive wheel 108. On the other hand, the first fastener seats 27 of the reduction-side housing 17 are fixedly attached to the track frame 107.

As shown in detail in FIG. 1, with the crawler drive units 1 being mounted on the running units 102, the entire speed reduction mechanism 4 and almost the entire transmission mechanism 3 are contained within the running units 102 in the width direction or within the width of the running units 102. More specifically, in FIG. 1, it is only the closing plate 22 of the transmission mechanism 3 that protrudes inwardly in the width direction out of the running unit 102.

The rotational axis Jm of the motor shaft 7 is immediately higher than the rotational axis Jn of the input shaft 16 (the rotational axis Jh of the second spur gear 12). The electric motor 2 is entirely positioned higher than the bottom surface 104*a* of the lower frame 104. The entire electric motor 2 here refers to the connector 50, motor case 5, and support case 8 that form the outline of the electric motor 2. The term "higher" means higher in the direction of gravity. If something is higher, it is more distant from the surface of road. To be specific, the electric motor 2 and the lower frame 104 are positioned relative to each other such that, by referring to FIG. 1, the lower edge of the motor case 5 is aligned with the bottom surface 104*a* as seen in the front-rear direction.

<How Crawler Drive Unit Works>

The following describes how the crawler drive unit 1 works. As shown in FIGS. 2 and 3, the motor shaft 7 of the rotor 6 is rotated as the electric motor 2 is driven. As the motor shaft 7 rotates, the rotation of the motor shaft 7 is transmitted to the input shaft 16 of the speed reduction mechanism 4 via the first and second spur gears 11 and 12 of the transmission mechanism 3. Here, the two spur gears 11 and 12 reduces the rotation of the motor shaft 7 and transmits the reduced rotation to the input shaft 16.

As the motor shaft 7 is rotated, the first sun gear 35 is rotated integrally with the motor shaft 7. The first planetary gears 36 meshing with the internal gear 37 and the first sun gear 35 rotate on their own axes on the first pillars 43, while orbiting around the first sun gear 35. The first planetary carrier 38 supporting the first planetary gears 36 rotates around the rotational axis Jn of the input shaft 16. The second sun gear 45 is rotated integrally with the first planetary carrier 38. The second sun gear 45 is formed in a cylindrical shape. Since the second sun gear 45 has the coupling 34 inserted therein in the radial direction, the rotation of the second sun gear 45 does not interfere with the rotation of the input shaft 16.

As the second sun gear 45 rotates, the carrier gears 46 meshing with the internal gear 37 and the second sun gear 45 rotate on their own axes on the second pillars 49. The rotation of the carrier gears 46 rotates the internal gear 37. The drive wheel 108 rotates integrally with the internal gear 37. In other words, the internal gear 37 reduces the rotation of the motor shaft 7 and outputs the reduced rotation to the drive wheel 108. The rotation of the drive wheel 108 actuates the crawler 109, as a result of which the construction machine 100 runs. In this way, the speed reduction mechanism 4 transmits the driving force to the crawler 109 via the drive wheel 108. The electric motor 2 applies the driving force to the speed reduction mechanism 4 via the transmission mechanism 3.

In the crawler drive unit 1, the rotational axis Jm of the motor shaft 7 is immediately higher than the rotational axis Jn of the input shaft 16 (the rotational axis Jh of the second spur gear 12). The electric motor 2 is entirely positioned higher than the bottom surface 104*a* of the lower frame 104. With such arrangement, the electric motor 2 can be positioned higher than the speed reduction mechanism 4 in the crawler drive unit 1. In this way, the electric motor 2 can be spaced away as much as possible from the road surface even if the electric motor 2 and the speed reduction mechanism 4 constitutes the crawler drive unit 1, which is used in the running unit 102, and the electric motor 2 protrudes out of the running unit 102 in the width direction. Therefore, the possibility of the electric motor 2 coming into contact with soil, sand, rocks, etc. while the construction machine 100 is in motion can be reduced. The construction machine 100 can run well.

In particular, since the electric motor 2 is entirely positioned higher than the bottom surface 104*a* of the lower frame 104, the possibility of the electric motor 2 coming into contact with soil, sand, rocks, etc. while the construction machine 100 is in motion can be certainly reduced. Since the electric motor 2 is positioned as high as possible, a working space can be left below the electric motor 2. This allows the crawler drive unit 1 to be maintained in a better manner.

The electric motor 2 (motor shaft 7) and the speed reduction mechanism 4 (input shaft 16), which are connected together via the transmission mechanism 3, are arranged such that their rotational axes Jm and Jn are parallel. This allows the driving power to be transmitted more efficiently from the electric motor 2 to the speed reduction mechanism 4 than in a case where the rotational axes Jm and Jn intersect. More specifically, the transmission mechanism 3 can be configured by the two spur gears 11 and 12 meshing with each other. The use of the spur gears 11 and 12 can contribute to transmit the rotation of the motor shaft 7 to the input shaft 16 efficiently.

The second spur gear 12 has a larger number of teeth than the first spur gear 11. Accordingly, the rotation of the second spur gear 12 is slower than the rotation of the first spur gear 11. This means that, in addition to the speed reduction mechanism 4, the transmission mechanism 3 can also contribute to reduce the rotation of the motor shaft 7. As a result, while the crawler drive unit 1 achieves a reduced size, it can also accomplish a high reduction ratio. The crawler drive unit 1 relating to the present aspect can achieve a high output.

With the crawler drive unit 1 being mounted on the running unit 102, the entire speed reduction mechanism 4 and almost the entire transmission mechanism 3 are contained within the running unit 102 in the width direction or within the width of the running unit 102. In this way, the speed reduction mechanism 4 can be covered with the running unit 102 (the drive wheel 108). This can prevent the speed reduction mechanism 4 from coming into contact with soil, sand, rocks and the like. This can lower the chance of the speed reduction mechanism 4 breaking down.

In the above-described first embodiment, the electric motor 2 is entirely positioned higher than the bottom surface 104*a* of the lower frame 104. The present embodiment, however, is not limited to such, and any configuration is acceptable as long as the entire electric motor 2 is positioned higher than the rotational axis Jn of the input shaft 16. In this way, the electric motor 2 can be still positioned higher than the speed reduction mechanism 4, contrary to the case where the rotational axis Jm of the motor shaft 7 is aligned with the rotational axis Jn of the input shaft 16. This modification can produce the same effects as the first embodiment described above.

Second Embodiment

Figure 4:
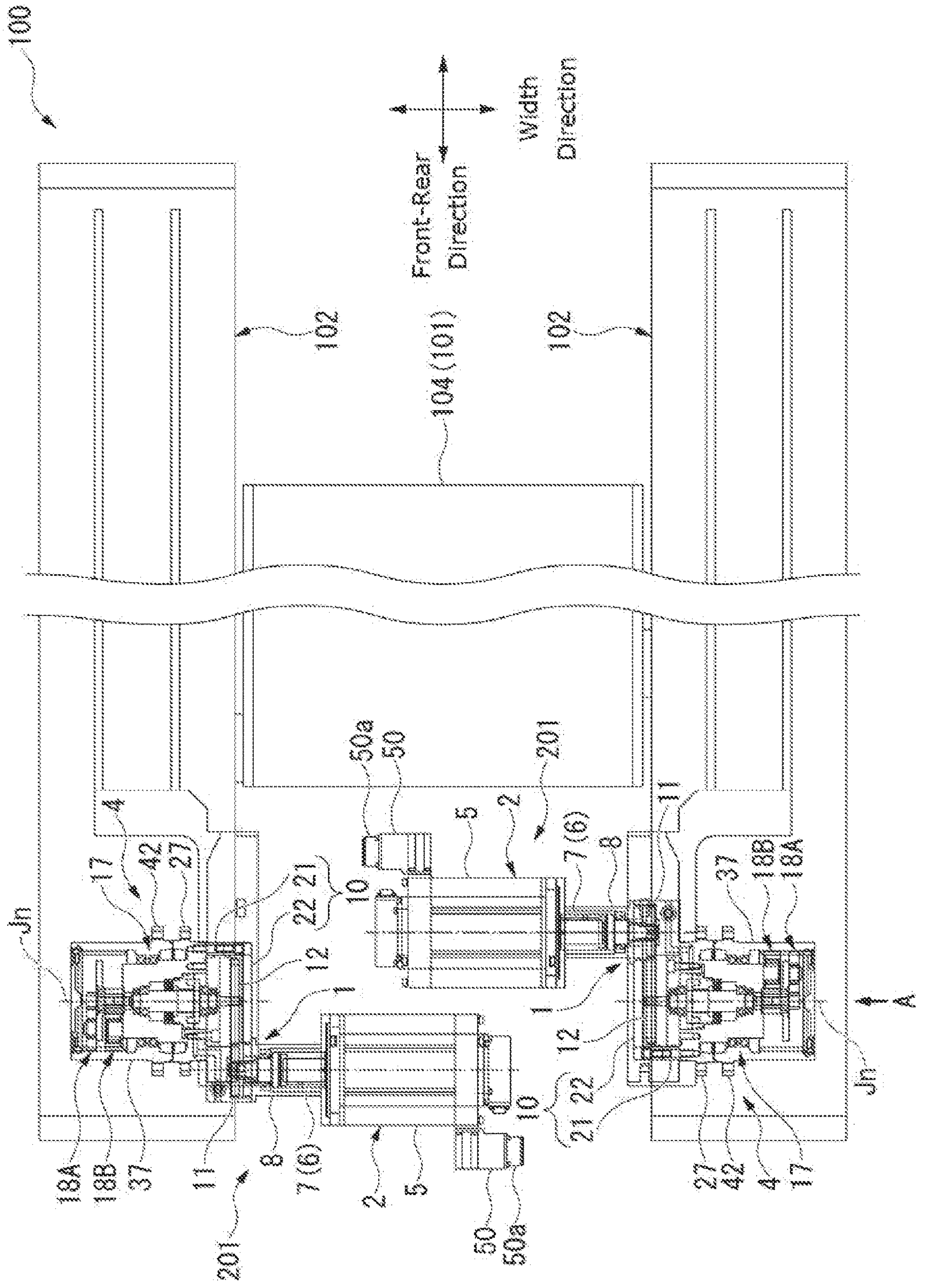
FIG. 4 is a plan view of crawlers, a lower frame and crawler drive units relating to a second embodiment of the present disclosure, viewed in a front-rear direction.
Figure 5:
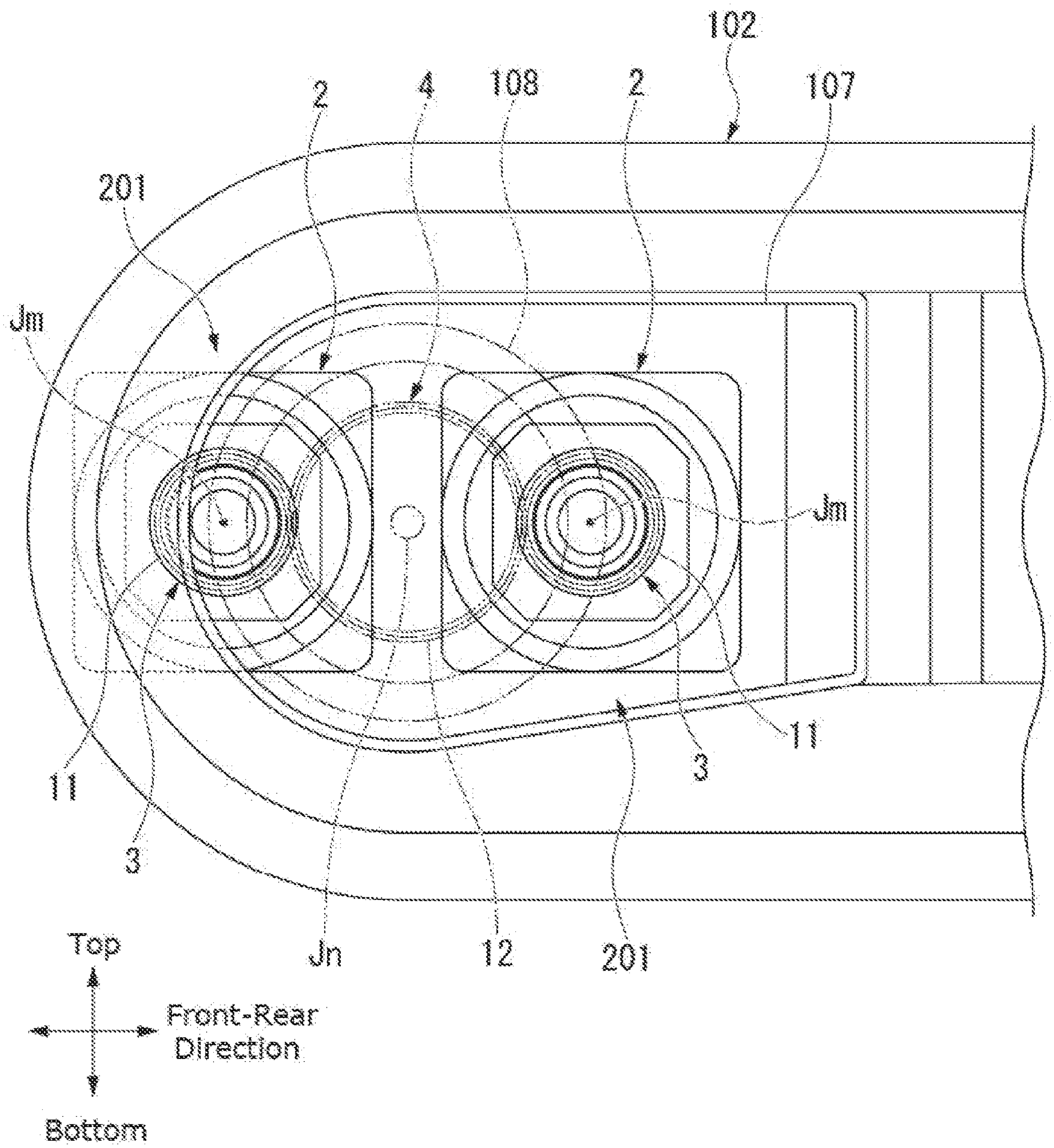
FIG. 5 schematically shows part of the crawler and crawler drive unit relating to the second embodiment of the present disclosure, viewed in a width direction.

The following describes a second embodiment of the present disclosure with reference to FIGS. 4 and 5 and by referring to FIG. 1. FIG. 4 is a plan view of running units 102, a lower frame 104 and crawler drive units 201 relating to a second embodiment, viewed in the front-rear direction. FIG. 5 schematically shows part of the running unit 102 and the crawler drive unit 201 relating to the second embodiment of the present disclosure, viewed in the width direction. FIG. 5 presents a view seen along the arrow A-A in FIG. 4. The second embodiment has the same features as the first embodiment described above. In the following description of the second embodiment, those features are assigned with the same reference numerals as in the first embodiment and not described (this applies to a third embodiment described further below).

In the second embodiment, a construction machine 100 includes a vehicle body 101, running units 102 for causing the vehicle body 101 to run, and crawler drive units 201 provided on the running units 102 and configured to drive the running units 102 (see also FIG. 1). In terms of these features, the second embodiment is the same as the above-described first embodiment (so is the following third embodiment). The second embodiment is different from the first embodiment in terms of the following. The electric motors 2 are oriented differently between in the crawler drive units 201 relating to the second embodiment and in the crawler drive units 1 relating to the first embodiment.

Specifically, as shown in FIGS. 4 and 5, the electric motors 2 of the crawler drive units 201 provided on the running units 102 are offset from their speed reduction mechanisms 4 in the front-rear direction. The two electric motors 2 are arranged next to each other in the front-rear direction. The electric motors 2 are entirely accommodated on the projection of the running units 102. In each crawler drive unit 201, the rotational axis Jm of the motor shaft 7 and the rotational axis Jn of the input shaft 16 are aligned with the same horizontally extending line. In other words, the electric motor 2 and the speed reduction mechanism 4 are located at the same height.

With such arrangement, as shown in, for example, FIG. 4, the respective crawler drive units 201 on the left and right running units 102 can be prevented from interfering with each other even when the running units 102 are arranged with a short distance being provided therebetween. Since the second embodiment eliminates the need of providing appropriate crawler drive units 201 for different spacings between the left and right running units 102, the crawler drive units 201 can be more versatile.

Modification Example of Second Embodiment

Figure 6:
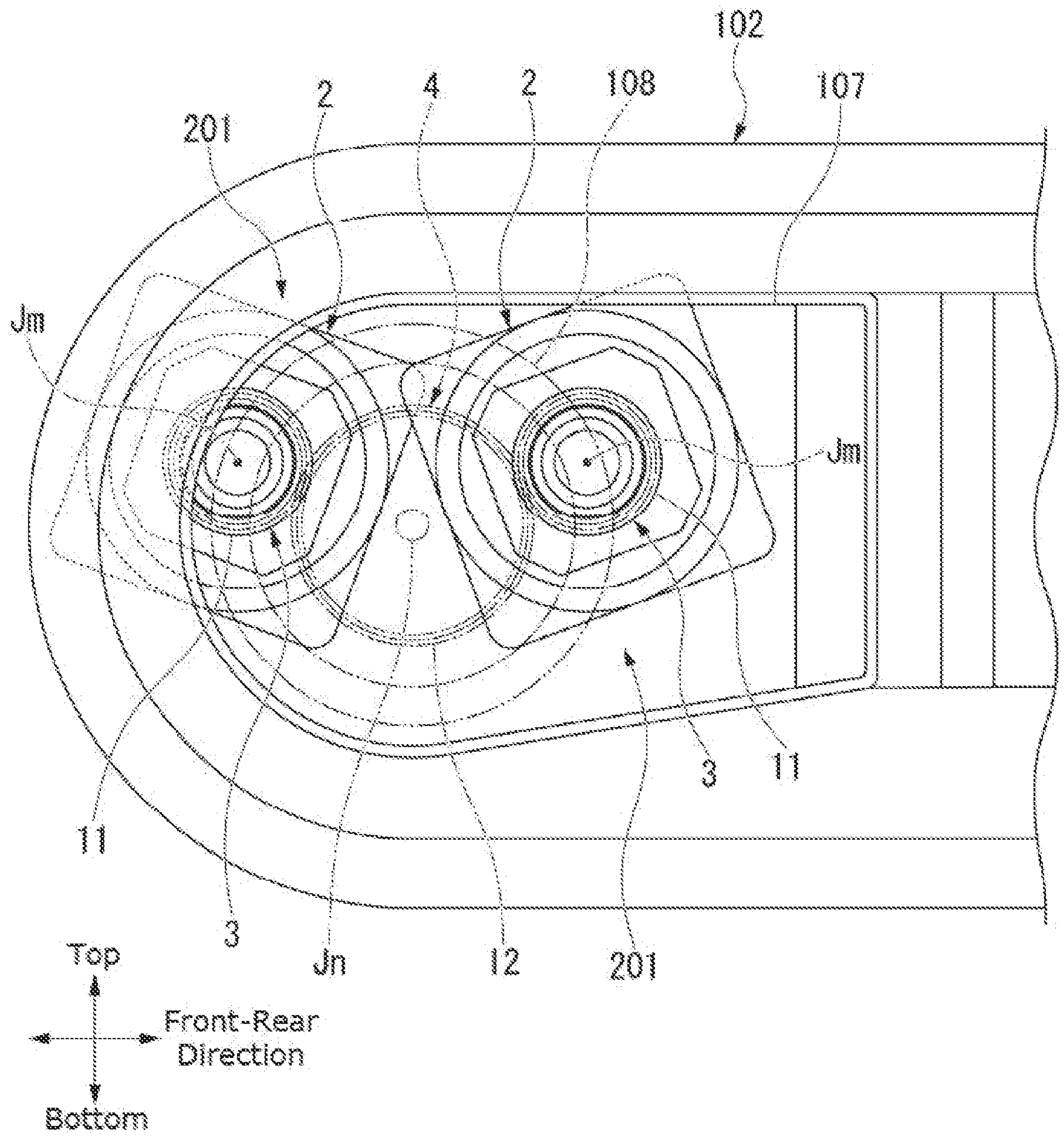
FIG. 6 schematically shows part of the crawler and crawler drive unit relating to a modification example of the second embodiment of the present disclosure, viewed in the width direction.

FIG. 6 schematically shows part of the running unit 102 and the crawler drive unit 201 relating to a modification example of the second embodiment of the present disclosure, viewed in the width direction. FIG. 6 corresponds to FIG. 5 referred to in the above. According to the above-described second embodiment, in each crawler drive unit 201, the rotational axis Jm of the motor shaft 7 and the rotational axis Jn of the input shaft 16 are aligned with the same horizontally extending line. The present embodiment, however, is not limited to such, and the rotational axis Jm of the motor shaft 7 may be positioned higher than the rotational axis Jn of the input shaft 16 as shown in FIG. 6. Such arrangement can not only produce the same effects as the above-described second embodiment but also lower the possibility of the electric motors 2 coming into contact with soil, sand, rocks, etc. while the construction machine 100 is in motion.

Third Embodiment

Figure 7:
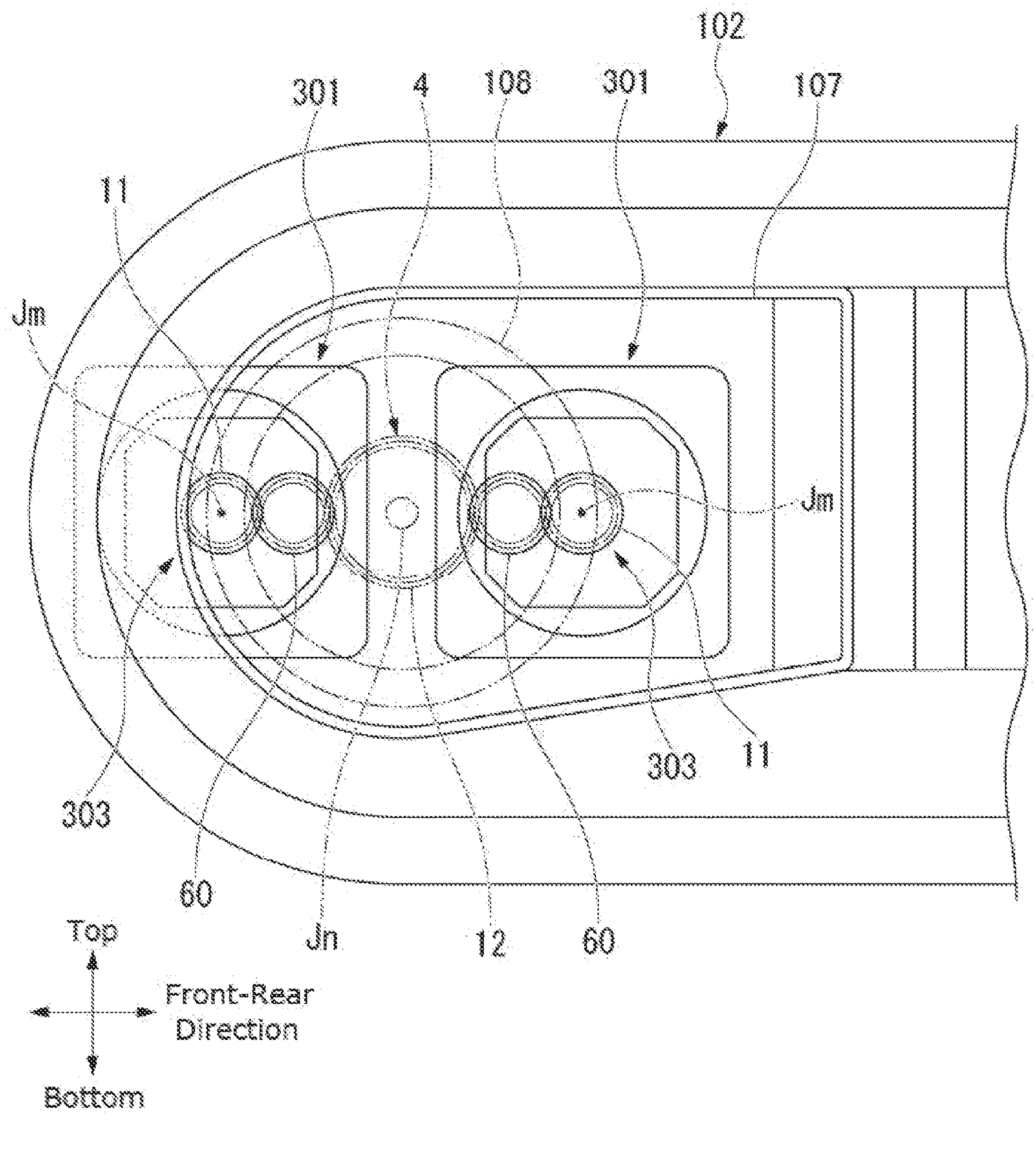
FIG. 7 schematically shows part of a crawler and a crawler drive unit relating to a third embodiment of the present disclosure, viewed in a width direction.

The following describes a third embodiment of the present disclosure with reference to FIG. 7. FIG. 7 schematically shows part of a running unit 102 and a crawler drive unit 301 relating to the third embodiment of the present disclosure, viewed in the width direction. FIG. 7 corresponds to FIG. 5 referred to in the above. As shown in FIG. 7, the third embodiment is different from the second embodiment in that a transmission mechanism 303 of the third embodiment is different from the transmission mechanism 3 of the second embodiment (the first embodiment).

To be specific, the transmission mechanism 303 has a third spur gear 60 between the first spur gear 11 and the second spur gear 12. The third spur gear 60 may have a different number of teeth than the first or second spur gear 11 or 12. The third spur gear 60 may have the same number of teeth as the first spur gear 11. In the third embodiment, the third spur gear 60 has the same number of teeth as the first spur gear 11. In each crawler drive unit 301, the rotational axis Jm of the motor shaft 7 and the rotational axis Jn of the input shaft 16 are aligned with the same horizontally extending line. In other words, the electric motor 2 and the speed reduction mechanism 4 are located at the same height.

Accordingly, the third embodiment produces the same effects as the second embodiment described above. Since the transmission mechanism 303 includes the three spur gears 11, 12 and 60, the rotational axis Jm of the motor shaft 7 can be significantly offset from the rotational axis Jn of the input shaft 16. In this manner, the crawler drive unit 301 can benefit from more flexible layouts.

Since the third spur gear 60 has a different number of teeth than the first or second spur gear 11 or 12, the transmission mechanism 303 can achieve a higher reduction ratio. As a result, while the crawler drive unit 301 achieves a reduced size, it can also accomplish a high reduction ratio. The crawler drive unit 301 can achieve a high output.

According to the third embodiment described above, the transmission mechanism 303 is constituted by the three spur gears 11, 12 and 60. The present embodiment, however, is not limited to such, and the transmission mechanism 303 may be constituted by four or more spur gears.

Modification Example of Third Embodiment

Figure 8:
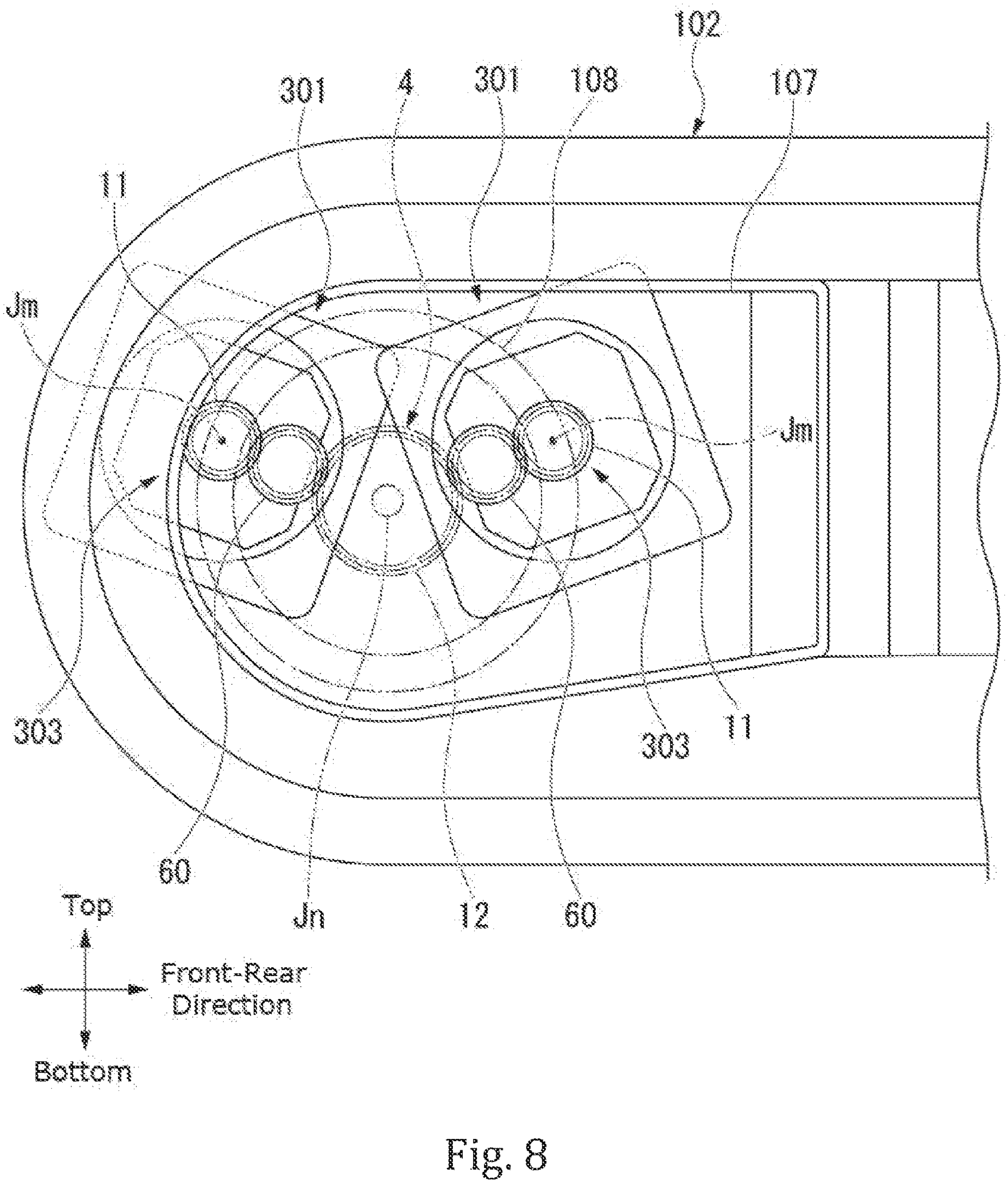
FIG. 8 schematically shows part of the crawler and the crawler drive unit relating to a modification example of the third embodiment of the present disclosure, viewed in the width direction.

FIG. 8 schematically shows part of the running unit 102 and the crawler drive unit 301 relating to a modification example of the third embodiment of the present disclosure, viewed in the width direction. FIG. 8 corresponds to FIG. 7 referred to in the above. According to the above-described third embodiment, in the crawler drive unit 301, the rotational axis Jm of the motor shaft 7 and the rotational axis Jn of the input shaft 16 are aligned with the same horizontally extending line. The present embodiment, however, is not limited to such, and the rotational axis Jm of the motor shaft 7 may be positioned higher than the rotational axis Jn of the input shaft 16 as shown in FIG. 8. Such arrangement can not only produce the same effects as the third embodiment but also lower the possibility of the electric motor 2 coming into contact with soil, sand, rocks, etc. while the construction machine 100 is in motion.

The configuration of the transmission mechanism 303 relating to the third embodiment described above may be applied to the transmission mechanism 3 relating to the first embodiment described above. In this manner, the electric motor 2 can be positioned further higher than the speed reduction mechanism 4. Therefore, the possibility of the electric motor 2 coming into contact with soil, sand, rocks, etc. while the construction machine 100 is in motion can be further reduced. The construction machine 100 can run further well.

The present disclosure is not limited to the above embodiments, but encompasses various modifications of the above embodiments within the purport of the present disclosure. For example, the foregoing embodiments provide the crawler drive units 1, 201 and 301 configured to drive the running units 102 provided on the construction machine 100. The present disclosure, however, is not limited to such, and the above-described crawler drive units 1, 201 and 301 can be applied to various devices having the running units 102.

In the above-described embodiments, the running unit 102 includes the track frame 107, the idler, the drive wheel (sprocket) 108, the rolling wheel, and the crawler 109 wound around the idler, driving wheel 108 and rolling wheel. The present disclosure, however, is not limited to such, and the running unit 102 may be configured in any manner as long as the rotation of the drive wheel 108 actuates the crawler 109, as a result of which the construction machine 100 runs.

In the embodiments described above, the transmission mechanisms 3 and 303 are constituted by more than one spur gear (11, 12 and 60). The present disclosure, however, is not limited to such, and the transmission mechanisms 3, 303 can be configured in any manner as long as they can transmit the rotation of the motor shaft 7 of the electric motor 2 to the input shaft 16 of the speed reduction mechanism 4. As another example, a pulley and a timing belt may constitute the transmission mechanisms 3 and 303. As yet another example, a sprocket and a chain may constitute the transmission mechanisms 3 and 303.

For example, a universal joint may be used as the transmission mechanism. In this case, the rotational axis Jm of the motor shaft 7 does not need to be parallel to the rotational axis Jn of the input shaft 16. If the rotational axis Jm of the motor shaft 7 intersects the rotational axis Jn of the input shaft 16, it may be only required that the motor shaft 7 be positioned higher than the rotational axis Jn of the input shaft 16. This arrangement produces the same effects as the above embodiments.

In the above-described embodiments, the transmission mechanisms 3 and 303 are also configured to reduce the rotation of the motor shaft 7. The present disclosure, however, is not limited to such, and the transmission mechanisms 3, 303 may be configured in any manner as long as they can transmit the rotation of the motor shaft 7 to the speed reduction mechanism 4. For example, the transmission mechanisms 3 and 303 may be configured to keep or increase the rotation of the motor shaft 7 and transmit the resulting rotation to the speed reduction mechanism 4.

In the above-described embodiments, the input shaft 16 is referred to as the input part in the claims. The present disclosure, however, is not limited to such, and the input part may be configured in any manner as long as it is capable of inputting the rotation of the electric motor 2 to the speed reduction mechanism 4. For example, the input shaft 16 is solid in the above-described embodiments, but may be hollow.

In the above-described embodiments, the speed reduction mechanism 4 includes the gear mechanisms 18A and 18B forming two stages. The gear mechanism 18A of the first stage is a so-called planetary gear mechanism including the first sun gear 35, the first planetary gears 36, the internal gear 37 and the first planetary carrier 38. The gear mechanism 18B of the second stage includes the second sun gear 45, the carrier gears 46 and the internal gear 37. The present disclosure, however, is not limited to such, and the speed reduction mechanism 4 can be configured in any manner as long as it can reduce the rotation of the motor shaft 7 of the electric motor 2 and output the reduced rotation. For example, a plurality of spur gears may mesh with each other, so that the rotational axis of the input part is offset from the rotational axis of the output part (the output side).

In the above-described embodiments, the speed reduction mechanism 4 is configured to transmit the rotation of the motor shaft 7 of the electric motor 2 transmitted thereto via the transmission mechanisms 3 and 303 from the internal gear 37 to the drive wheel 108. The present disclosure, however, is not limited to such, and the speed reduction mechanism 4 may be configured in any manner as long as it can transmit the rotation of the motor shaft 7 to the drive wheel 108. In other words, when the speed reduction mechanism is constituted by a plurality of spur gears, for example, it can be configured in any manner as long as the spur gear of the last stage can transmit the rotation of the motor shaft 7 to the drive wheel 108.

In the above embodiments, the electric motor 2 protrudes in the width direction out of the running unit 102. The present disclosure, however, is not limited to such, and the above-described crawler drive units 1, 201 and 301 can be applied even if, for example, the crawler drive units 1, 201 and 301 can be contained within the running unit 102 so that the electric motor 2 does not protrude in the width direction out of the running unit 102. Note that the crawler drive units 1, 201 and 301 described above can be suitably applied when the electric motor 2 protrudes in the width direction out of the running unit 102.

In the crawler drive units 1, 201, 301 relating to the above-described embodiments, the internal gear 37 of the speed reduction mechanism 4 is integrated with the drive wheel 108. The internal gear 37 is rotatable integrally with the drive wheel 108. The present disclosure, however, is not limited to such, and any configuration is acceptable as long as the crawler 109 can be actuated by the output from the speed reduction mechanism 4. For example, the crawler 109 may be wrapped directly around the internal gear 37, so that the internal gear 37 may serve as the drive wheel 108.

The foregoing embodiments disclosed herein describe a plurality of physically separate constituent parts. They may be combined into a single part, and any one of them may be divided into a plurality of physically separate constituent parts. Irrespective of whether or not the constituent parts are integrated, they are acceptable as long as they are configured to solve the problems.

What is claimed is:

1. A crawler drive unit which is provided on a vehicle including a vehicle body and a running unit including a crawler for causing the vehicle body to run, and configured to drive the running unit to transmit a driving force to the crawler, the crawler drive unit comprising:
   - a speed reduction mechanism mounted on the running unit, the speed reduction mechanism being configured to transmit the driving force to the crawler provided on the running unit;
   - a transmission mechanism for transmitting the driving force to the speed reduction mechanism; and
   - an electric motor for applying a rotational force to the transmission mechanism, wherein the electric motor includes:
     - a motor case;
     - a motor shaft, a part of the motor shaft protruding out of the motor case; and a support case that protrudes from the motor case in a direction same as a direction in which the motor shaft protrudes out of the motor case and rotatably supports the motor shaft, wherein the speed reduction mechanism includes;

an input part for receiving the driving force input thereto from the transmission mechanism, and a reduction-side housing that rotatably supports the input part, wherein the motor shaft of the electric motor is positioned higher in a direction of gravity than a rotational axis of the input part, wherein the transmission mechanism is connected to a tip end of the part of the motor shaft protruding out of the motor case, wherein an end of the support case on a side opposite to the motor case is fixed to the transmission mechanism, wherein the motor case is separated from the speed reduction mechanism and the crawler in a width direction of the vehicle body that is along a horizontal direction and orthogonal to a front-rear direction along a direction in which the vehicle body runs, wherein the transmission mechanism includes:

a transmission-side housing, and a plurality of gears rotatably housed in the transmission-side housing, meshing with each other, and arranged in the direction of gravity, wherein the support case and the reduction-side housing are respectively connected to two surfaces of the transmission-side housing in the width direction of the vehicle body, wherein the support case and the reduction-side housing do not overlap each other in the width direction of the vehicle body, wherein the plurality of gears mesh with each other at a same position in the width direction of the vehicle body, wherein the plurality of gears includes a first spur gear and a second spur gear, wherein the first spur gear is fixedly fitted onto the tip end of the motor shaft and rotates integrally with the motor shaft, wherein an end of the input part of the speed reduction mechanism is fixedly fitted into the second spur gear, and the second spur gear and the input part rotate integrally with each other, wherein the transmission mechanism reduces rotation of the motor shaft and transmits the reduced rotation to the input part, and wherein the second spur gear has a larger number of teeth than the first spur gear, and the rotation of the second spur gear is slower than the rotation of the first spur gear.

2. The crawler drive unit of claim 1, wherein a rotational axis of the motor shaft is parallel to the rotational axis of the input part.

3. The crawler drive unit of claim 1, wherein the electric motor protrudes out of the speed reduction mechanism in the width direction of the vehicle body.

4. The crawler drive unit of claim 1, wherein the electric motor is entirely positioned higher than the rotational axis of the input part.

5. The crawler drive unit of claim 1, wherein a bottom edge of the electric motor is aligned with a bottom surface of the vehicle body, or the electric motor is entirely positioned higher than the bottom surface of the vehicle body.

6. The crawler drive unit of claim 1, wherein the speed reduction mechanism is housed such that at least part thereof is contained within the crawler in the width direction of the vehicle body.

7. The crawler drive unit of claim 1, wherein the plurality of gears includes a third spur gear between the first spur gear and the second spur gear.

8. A construction machine comprising:

a vehicle body;

a running unit for causing the vehicle body to run;

a speed reduction mechanism provided in the running unit, the speed reduction mechanism being configured to transmit a driving force to a crawler provided on the running unit;

a transmission mechanism for transmitting the driving force to the speed reduction mechanism; and an electric motor protruding out of the speed reduction mechanism in a width direction of the vehicle body, the electric motor being configured to apply a rotational force to the speed reduction mechanism, wherein the electric motor includes:

a motor case;

a motor shaft, a part of the motor shaft protruding out of the motor case; and a support case that protrudes from the motor case in a direction same as a direction in which the motor shaft protrudes out of the motor case and rotatably supports the motor shaft, wherein the transmission mechanism reduces rotation of the motor shaft of the electric motor and transmits the reduced rotation to the speed reduction mechanism, wherein a bottom edge of the electric motor is aligned with a bottom surface of the vehicle body, or the electric motor is entirely positioned higher than the bottom surface of the vehicle body, wherein the transmission mechanism is connected to a tip end of the part of the motor shaft protruding out of the motor case, wherein an end of the support case on a side opposite to the motor case is fixed to the transmission mechanism, and wherein the motor case is separated from the speed reduction mechanism and the crawler in a width direction of the vehicle body that is along a horizontal direction and orthogonal to a front-rear direction along a direction in which the vehicle body runs, wherein the speed reduction mechanism includes:

an input part for receiving the driving force input thereto from the transmission mechanism, and a reduction-side housing that rotatably supports the input part, wherein the transmission mechanism includes:

a transmission-side housing, and a plurality of gears rotatably housed in the transmission-side housing, meshing with each other, and arranged in the direction of gravity, wherein the support case and the reduction-side housing are respectively connected to two surfaces of the transmission-side housing in the width direction of the vehicle body, wherein the support case and the reduction-side housing do not overlap each other in the width direction of the vehicle body, wherein the plurality of gears mesh with each other at a same position in the width direction of the vehicle body, wherein the plurality of gears includes a first spur gear and a second spur gear, wherein the first spur gear is fixedly fitted onto the tip end of the motor shaft and rotates integrally with the motor shaft, wherein an end of the input part of the speed reduction mechanism is fixedly fitted into the second spur gear, and the second spur gear and the input part rotate integrally with each other, and wherein the second spur gear has a larger number of teeth than the first spur gear, and the rotation of the second spur gear is slower than the rotation of the first spur gear.

* * * * *